(12) United States Patent
Oudet et al.

(10) Patent No.: US 6,518,749 B1
(45) Date of Patent: Feb. 11, 2003

(54) MAGNETIC SENSOR FOR DELIVERY OF AN ELECTRICAL SIGNAL PROPORTIONAL TO POSITION

(75) Inventors: Claude Oudet, Besancon (FR); Pierre Gandel, Montfocon (FR); Daniel Prudhamm, Thise (FR)

(73) Assignee: MMT (S. A.), Fribourg (CH)

( * ) Notice: Subject to any disclaimer, the term of this patent is extended or adjusted under 35 U.S.C. 154(b) by 0 days.

(21) Appl. No.: 09/424,848

(22) PCT Filed: Jun. 4, 1998

(86) PCT No.: PCT/FR98/01139

§ 371 (c)(1),
(2), (4) Date: Mar. 1, 2000

(87) PCT Pub. No.: WO98/55828

PCT Pub. Date: Dec. 10, 1998

(30) Foreign Application Priority Data

Jun. 4, 1997 (FR) .............................................. 97 06897

(51) Int. Cl.⁷ ........................... G01B 7/30; G01P 3/487; G01D 5/14
(52) U.S. Cl. .............................. 324/207.2; 324/207.25; 338/32 H
(58) Field of Search ........................ 324/207.2, 207.25, 324/207.21, 201.17, 207.22, 207.24; 338/321.1

(56) References Cited

U.S. PATENT DOCUMENTS 5,861,745 A * 1/1999 Herden ..................... 324/207.2
6,232,771 B1 * 5/2001 Herden et al. ......... 324/207.25

* cited by examiner

*Primary Examiner*—Walter E. Snow
(74) *Attorney, Agent, or Firm*—Oblon, Spivak, McClelland, Maier & Neustadt, P.C.

(57) ABSTRACT

The invention concerns a magnetic position sensor for delivering an electric signal proportional to the position, including of a mobile part having at least a thin permanent magnet movable in a main air gap. The air gap is defined by two ferromagnetic parts and, the ferromagnetic parts defining between them a secondary air gap including a sensor sensible to magnetism. The mobile part is arranged such that penetration on the magnetic part into the main air gap is partial over part of the useful travel so that the sensor sensible to magnetism delivers a signal proportional to the degree of engagement of the magnetic parts in the main air gap.

15 Claims, 16 Drawing Sheets

MAGNETIC SENSOR FOR DELIVERY OF AN ELECTRICAL SIGNAL PROPORTIONAL TO POSITION

BACKGROUND OF THE INVENTION

1. Field of the Invention

It relates more specifically to the field of sensors whose operating principle is based on detection of the variation of the magnetic flux produced by a permanent magnet in a ferromagnetic structure containing an air gap in which there is housed a Hall probe or an equivalent magnetic-field-sensing detection means.

2. Discussion of the Background

The general principle of such sensors is known. They are described in, for example, European Patents EP514530, EP665416 or EO596068.

There is also known a rotary sensor described in European Patent EP611951, made from a first stator part integral with a magnet which has semi-discoid shape and which is movable relative to two fixed stator parts defining a secondary air gap, inside which there is placed a Hall probe.

Another patent, German Patent DE29520111, describes a sensor containing an annular outer stator part defining an annular air gap with an inner stator part. The annular permanent magnet is placed in the main air gap. One of the annular stator parts has a secondary air gap, inside which there is placed a Hall probe.

In both cases, the magnet is plunged permanently and completely into the main air gap, and the signal detected by the Hall probe is a combination of two magnetic fields, making it impossible to guarantee perfect linearity of the output signal.

SUMMARY OF THE INVENTION

The objective of the invention is to simplify the construction of such sensors and to improve the response linearity, or in other words the amplitude of the electrical signal delivered as a function of the position of the mobile portion. The invention differs from sensors of the prior art mainly by the fact that the magnet progressively penetrates into the air gap, and in that it is completely plunged into the air gap only for an extreme position. In the other positions, the magnet is plunged only partly into the air gap, and the signal delivered by the Hall probe is a function of the degree of penetration of the permanent magnet into the air gap. This embodiment also makes it possible to modify the response function by choosing a particular geometry of the magnet. It is possible to generate a response signal corresponding to any desired function of the degree of penetration, by choosing a shape of the magnet or a shape of the stator parts defining the main air gap such that the variation of width, for example, corresponds to the sought function.

The invention is applicable just as well to linear sensors as to rotary sensors.

The invention relates to a magnetic position sensor for delivery of an electrical signal proportional to position, comprising a mobile part having at least one thin permanent magnet transversely magnetized in the direction of least thickness, which magnet is movable in a main air gap. The main air gap is defined by at least two ferromagnetic portions. These two ferromagnetic portions define between them a secondary air gap containing a. magnetic-field sensor. The mobile portion is designed such that the penetration of the magnetized portion into the main air gap is partial over a portion of the useful travel.

Advantageously, the length of the magnetized portion is at least equal to C+E, where C denotes the useful travel of the mobile portion and E denotes the thickness of the main air gap.

Preferably, the length of the air gap is at least equal to C+E, where C denotes the useful travel of the mobile portion and E denotes the thickness of the main air gap.

The main air gap comprises the space between the two stator portions, inside which space the magnet can be displaced during its useful travel, or in other words the travel over which it is desired that a position signal be obtained.

The secondary air gap is the zone in which the flux of the main air gap is collected. It is a space inside which the permanent magnet does not penetrate during its useful travel.

According to a preferred embodiment, the length of the magnetized portion is greater than the length of the air gap.

According to a preferred variant, the magnetic position sensor is characterized in that the mobile portion comprises two magnets magnetized in opposite directions parallel to the least thickness, the two magnets being disposed side-by-side in the direction perpendicular to the displacement.

According to a first embodiment, the mobile portion comprises two magnetized magnets of semicylindrical shape and is movable in a main air gap defined between a cylindrical yoke and semicylindrical stator parts, these semicylindrical parts defining between them a secondary air gap perpendicular to the axis of rotation.

According to a second embodiment, the mobile portion comprises at least one thin permanent magnet of rectangular shape and is movable in an air gap perpendicular to the magnetization direction, defined by a substantially U-shaped stator structure, the stator structure having a secondary air gap containing an axis parallel to the direction of displacement and perpendicular to the magnetic field lines generated by the permanent magnet.

According to a third embodiment, the mobile portion comprises two magnets in the form of discoid sectors magnetized in opposite directions, the fixed portion comprising two ferromagnetic parts in the form of discoid sectors.

According to another variant, the magnet has a geometric deformation specifically designed to permit compensation for a linearity defect due to a magnetic leak or to a perturbing field. As an example, this deformation will be a ridge inclined relative to the displacement direction in the case of a linear sensor, or a variable length of the magnet in the case of a rotary sensor.

BRIEF DESCRIPTION OF THF DRAWINGS

The invention will be understood better on reading the description hereinafter of non-limitative practical examples, given with reference to the attached drawings, wherein:

FIGS. 1 to 3 respectively show views in perspective, in cross section and in axial section along AA' of an angular position sensor according to the invention;

FIG. 4 shows the voltage/position curve measured on the Hall probe;

FIGS. 5 to 7 respectively show views in perspective, in cross section and in longitudinal section along BB' of a linear position sensor according to the invention;

FIGS. 8 and 9 respectively show views in cross section and in longitudinal section along CC' of an angular position sensor according to the invention;

DESCRIPTION OF THE PREFERRED EMBODIMENTS

Figure 1:
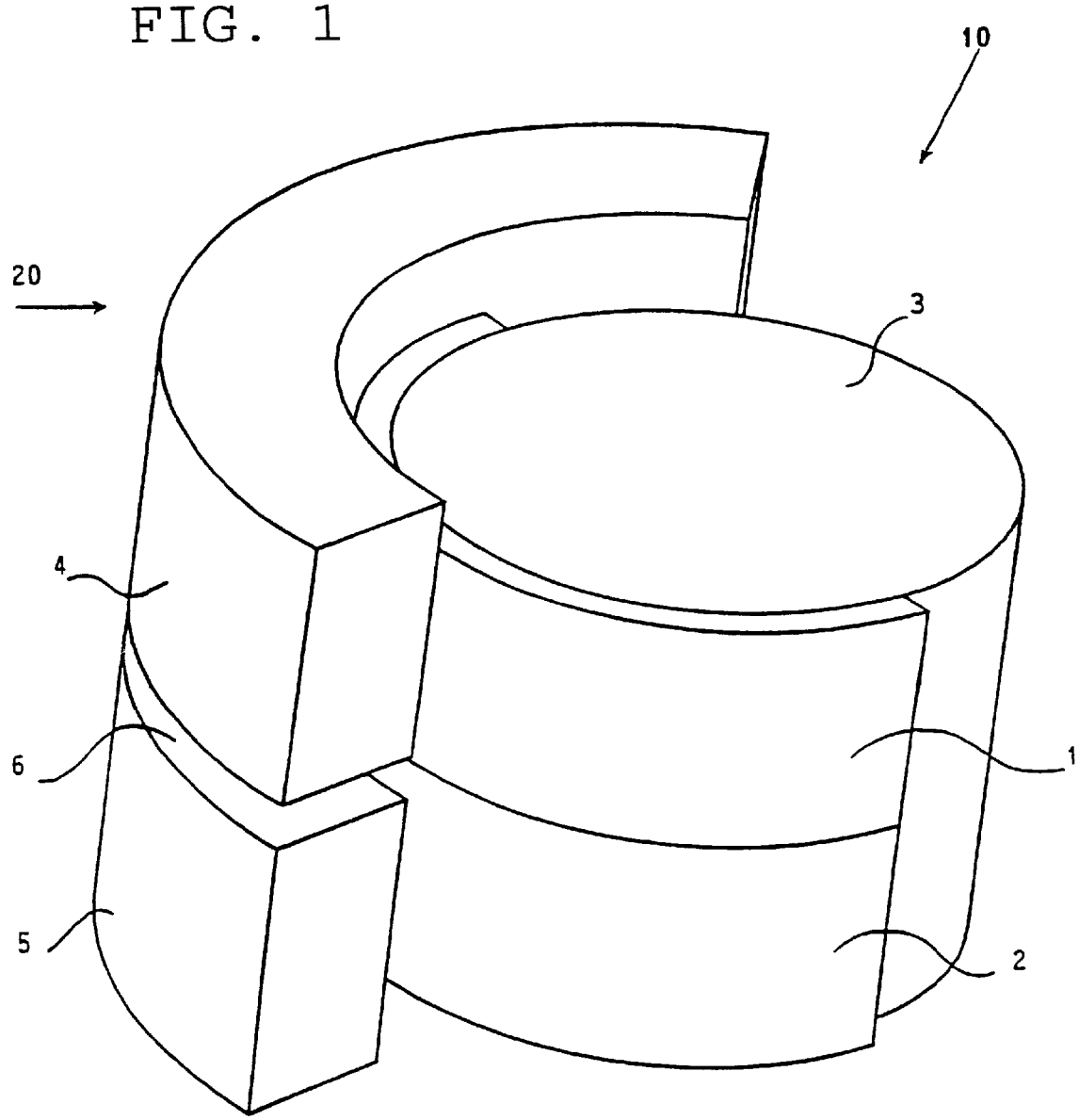
Figure 2:
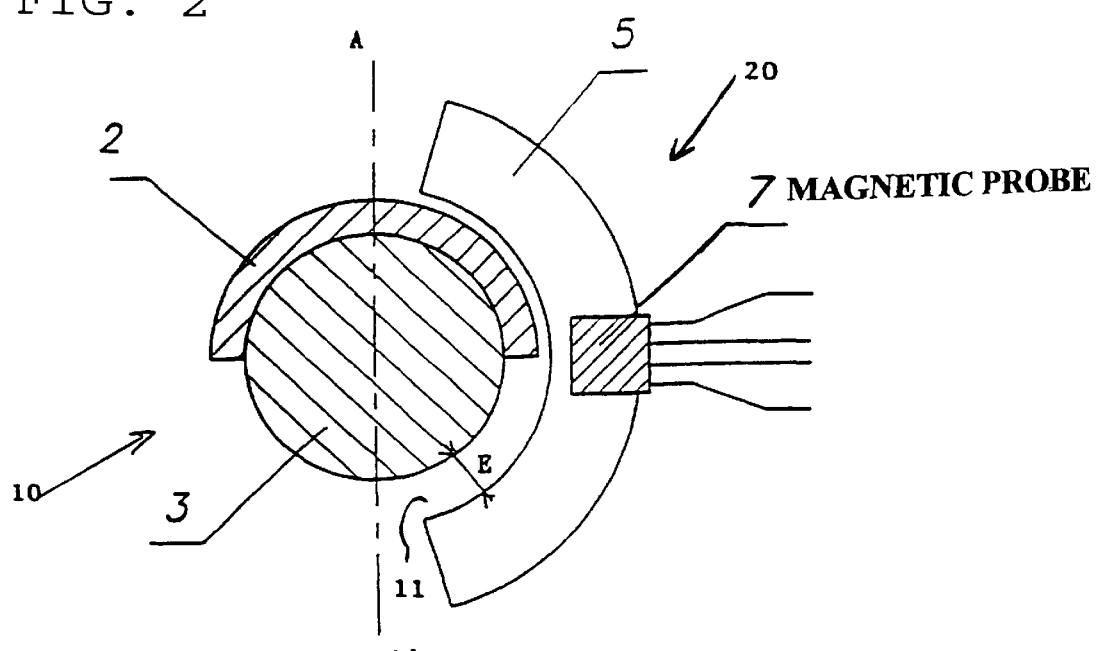
Figure 3:
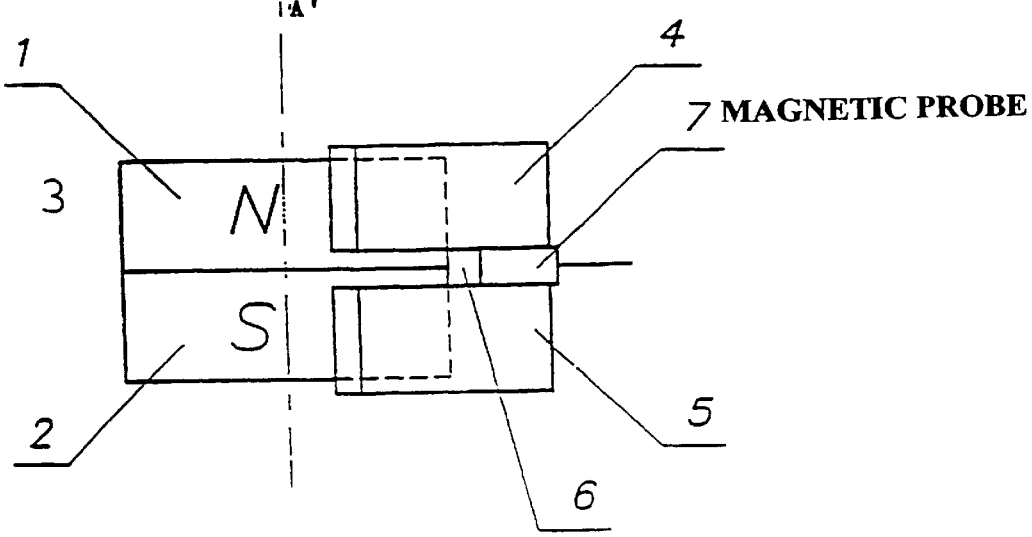

FIGS. 1 to 3 respectively show views in perspective, in cross section and in axial section along AA' of an angular position sensor according to the invention.

This angular position sensor has a mobile portion (10) formed from two thin magnets (1, 2) and a yoke (3) and by a coaxial fixed portion (20) formed from two stators (4, 5).

In the described example, mobile portion (10) comprises two thin semicylindrical magnets (1, 2) extending over about 180° of arc. The angular value required depends on the useful travel sought. The two thin magnets (1, 2) are superposed and are magnetized radially in opposite directions, parallel to the direction of least thickness. Thus one of the magnets (1) has an outer north pole and an inner south pole, while the other magnet (2) has an outer south pole and an inner north pole.

These magnets (1, 2) are superposed and aligned with the axis of rotation, and in the described example are joined. They are bonded to a yoke (3) formed by a ferromagnetic cylinder, such as an annealed iron-nickel alloy. They may also have the form of flexible magnets fixed by brass pins. A spindle, which is not shown, ensures that mobile portion (10) can be driven in rotation. It is to be noted that, by equivalence, portion (10) could be fixed and portion (20) driven in rotation, since the sensor in fact detects the relative position of these two portions.

Yoke (3) and the two fixed stator parts (4, 5) define between them an annular air gap (11) of thickness E.

Fixed portion (20) comprises two semiannular parts (4, 5) made of ferromagnetic material. In common with magnets (1, 2), these two parts (4, 5) are superposed and aligned with the axis of rotation. They extend over about 170° of arc. They define between them a secondary air gap (6) in which there is housed a Hall probe (7) or any other magnetic-field-sensing component.

In this alternative design, the sensor operates as follows:

When mobile portion (10) is positioned such that the entire surface area of magnets (1, 2) is disposed in air gap (11)—which corresponds to a rotation of 90° in the anti-trigonometric sense relative to the position shown in FIG. 2—the arcs of the magnets and stator correspond and face each other.

The north pole of magnet (1) then coincides with upper stator pole (4). The magnetic field is closed at the south pole of the other magnet (2) via second stator portion (5) then yoke (3). The flux in secondary, measuring air gap (6) is then maximum. The signal delivered by Hall probe (7) is also maximum.

When the position of fixed portion (20) and mobile portion (10) is displaced by 180° relative to the first situation, the induction in the measuring air gap is zero. The north magnet closes on the south magnet in the air, without occupying the stator path.

Between these two extreme positions, the induction in the air gap varies linearly as a function of position and is directly proportional to the surface area Sa of the magnetized poles facing the two stators (4, 5).

Referring to the various Figures of the drawings,

C denotes the usefull travel, or in other words the travel over which a linear measurement is sought;

E denotes the radial thickness of the main air gap between stators (4, 5) and yoke (3);

L denotes the radial thickness of the 2 magnets;

Br denotes the remanent induction of the 2 magnets;

e denotes the air gap at the position of the measuring probe;

Sa ($\theta$) denotes the surface area of the magnet facing the stators for given angular position $\theta$;

Se denotes the cross-sectional area of the main air gap between cylindrical ferromagnetic yoke (3) and the two stators (4, 5).

The induction Be in the measuring air gap is substantially equal to:

$$Be(\theta)\ (2.Br.L.Sa(\theta))/(2.Se.E+SE.e)$$

The annular length of the two stators (4, 5) must be at least equal to C+E in order for the sensor to have linearity of better than 99% over the full scale of the signal for useful travel C.

Figure 4:
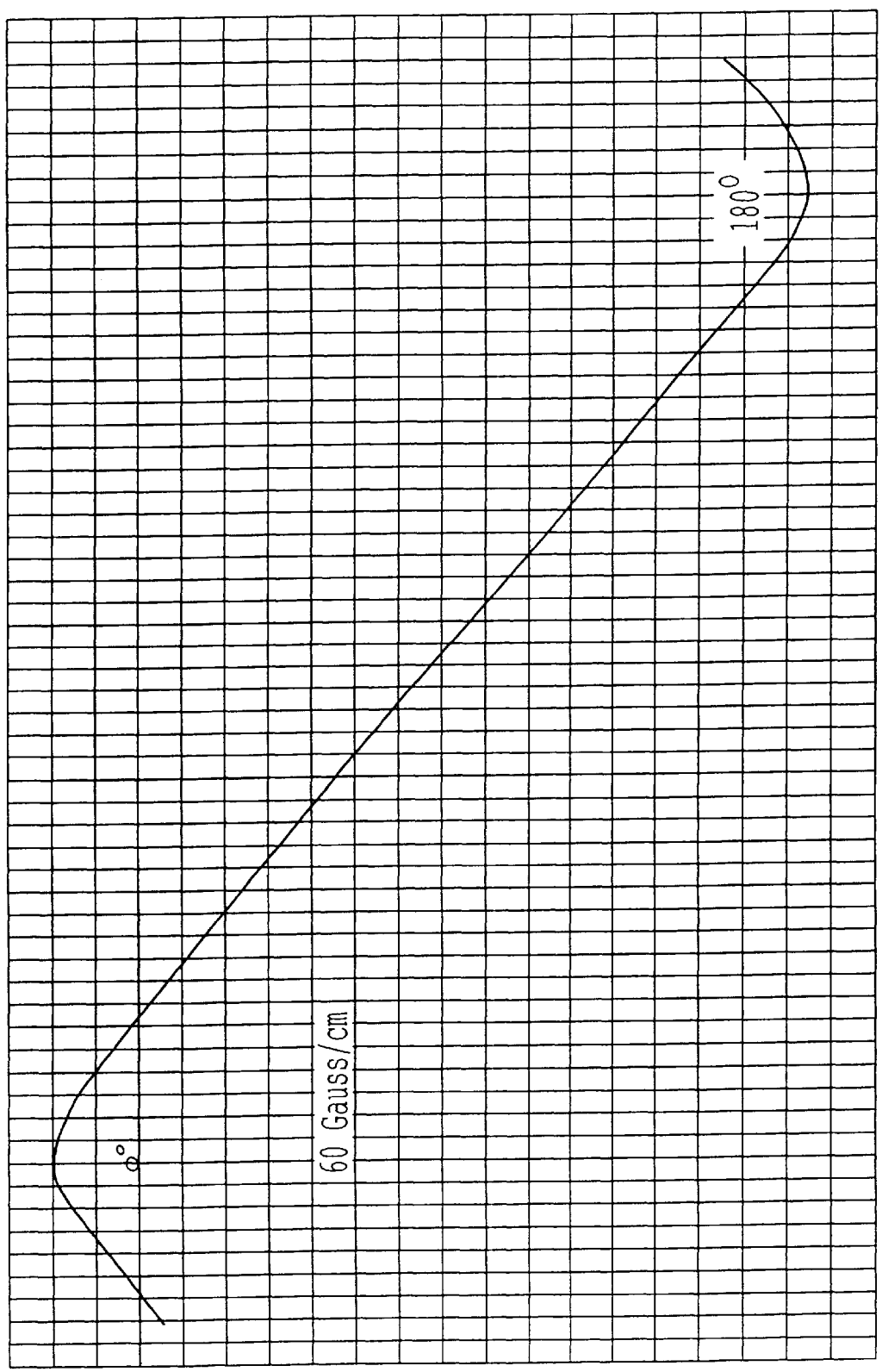

FIG. 4 shows the voltage/position curve measured on the Hall probe. It is evident that this curve has extremely good linearity.

Figure 5:
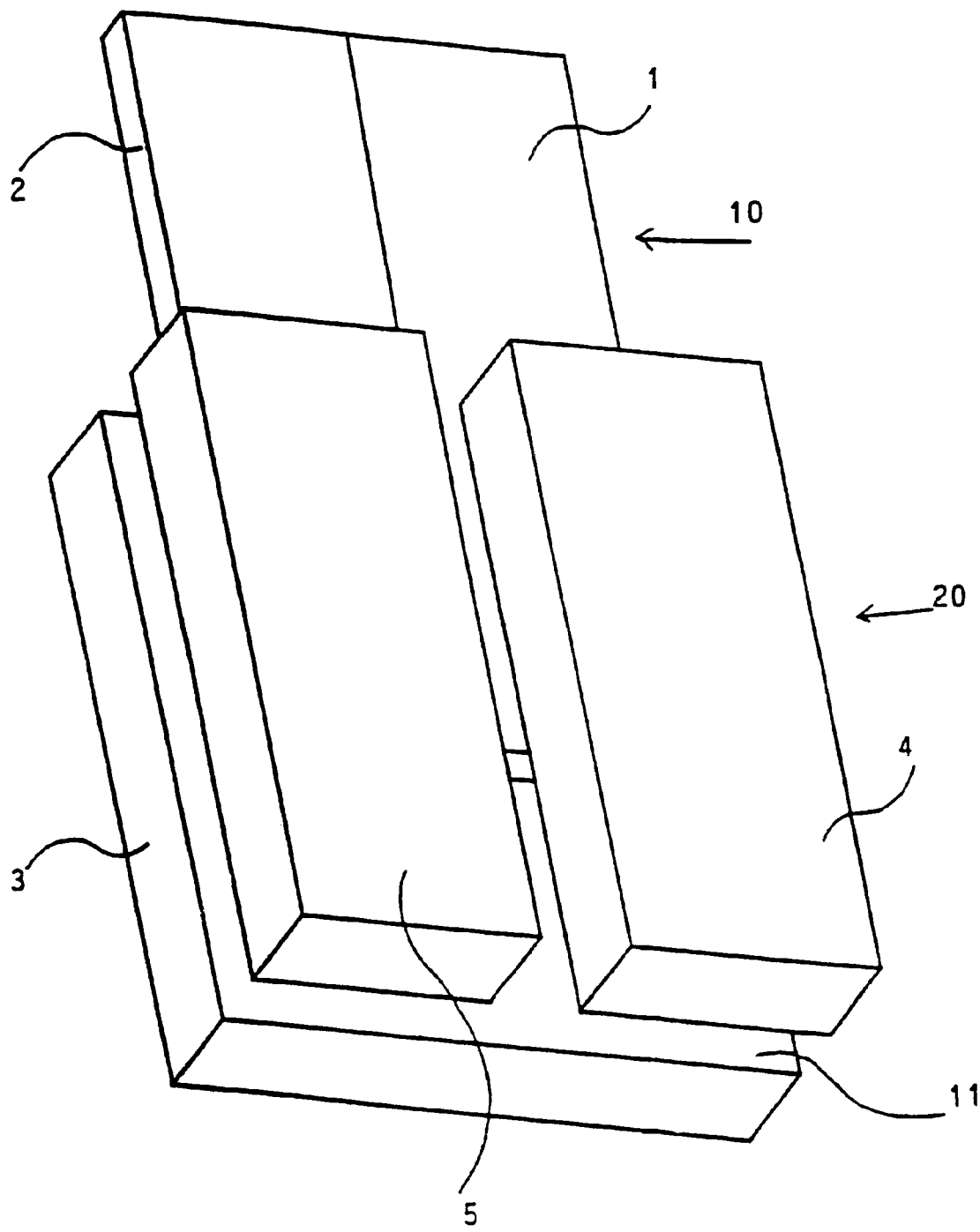
Figure 6:
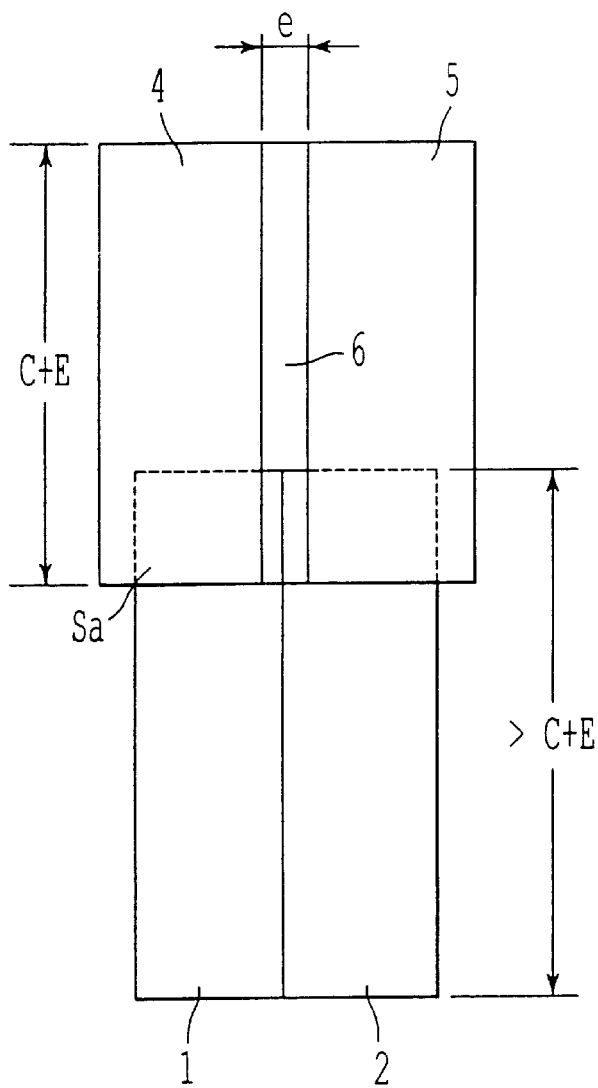
Figure 7:
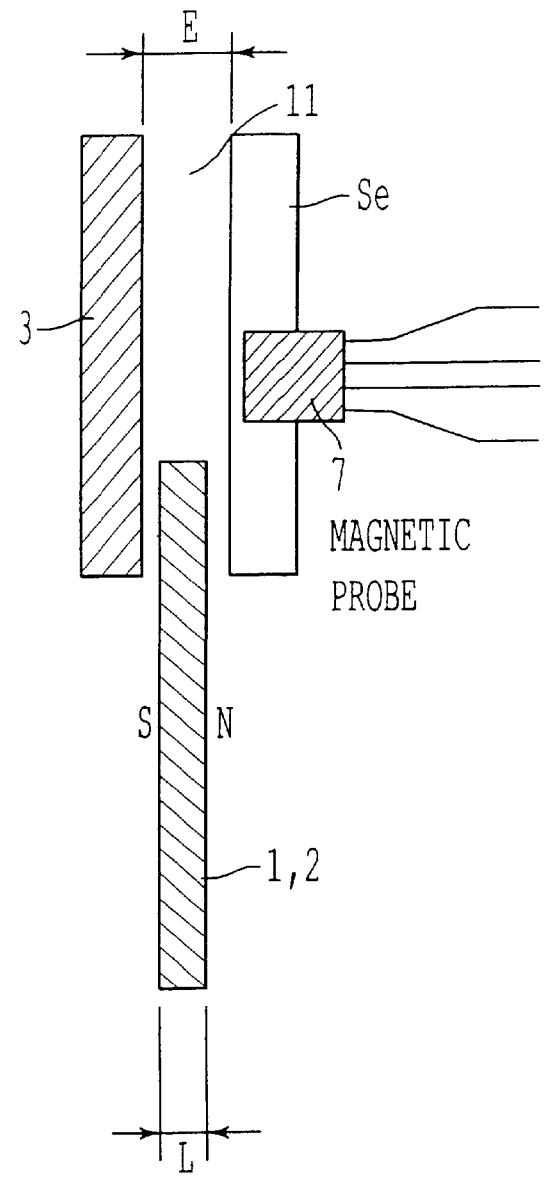

FIGS. 5 to 7 respectively show views in perspective, in cross section and in longitudinal section along BB' of a linear position sensor according to the invention.

As in the angular variant, the sensor has a mobile portion (10) and a fixed portion (20).

The mobile portion comprises two thin magnets (1, 2) of rectangular shape, magnetized parallel to the least thickness but in opposite directions. They are aligned perpendicular to the direction of displacement.

In this practical embodiment, which is described by way of non-limitative example, yoke (3) is not bonded to magnets (2, 3), but is fixed. It is formed by a plate made of ferromagnetic material such as an annealed iron-nickel alloy.

The two stator parts (4, 5) define between them a secondary air gap (6) in which there is placed a Hall probe (7). The length of the two stators is preferably greater than C+E to guarantee good linearity. The mobile portion permits travel between one extreme position in which magnets (1, 2) are completely or partly withdrawn from main air gap (11), and a second extreme position in which they are introduced into air gap (11).

This embodiment makes it possible to shorten the stator structure relative to the sensors of the prior art.

Figure 8:
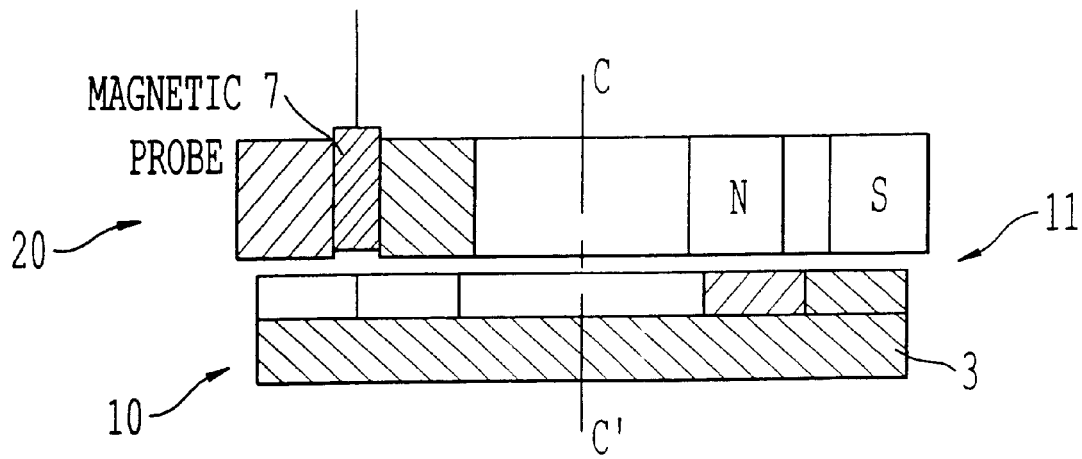
Figure 9:
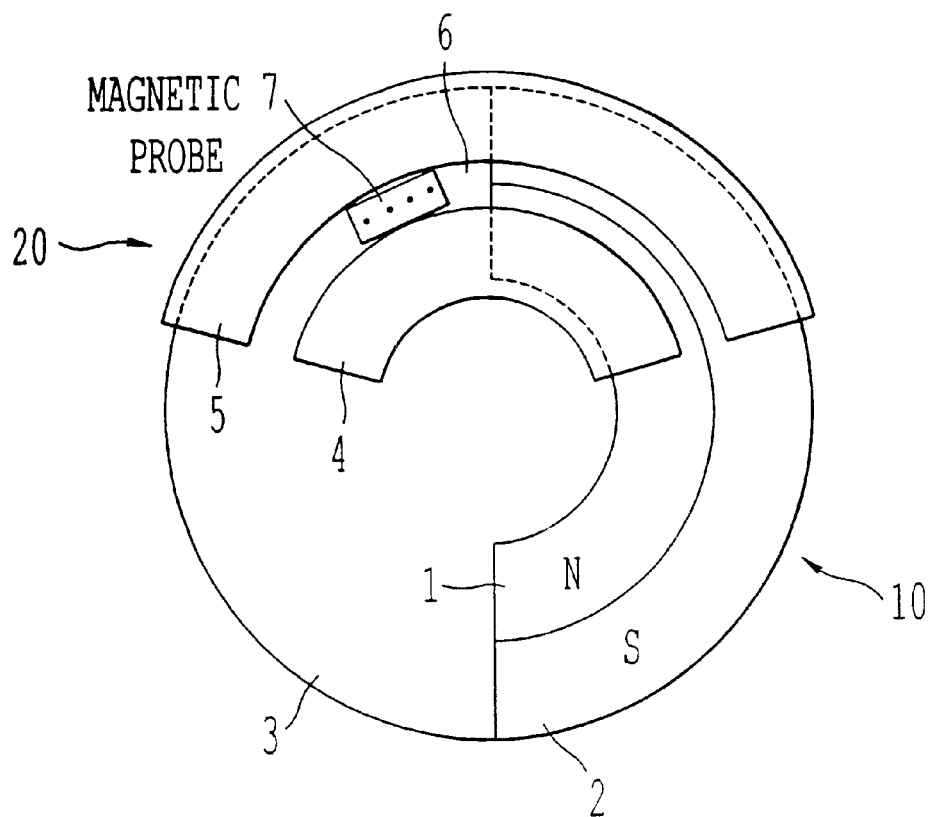

FIGS. 8 and 9 respectively show views in cross section and in longitudinal section along CC' of another angular position sensor according to the invention.

Mobile portion (10) has the form of a disc or arc of a disc. It is provided with a discoid part forming yoke (3) and supporting two magnets (1, 2) in the form of semiannular sectors extending over circular arcs on the order of 180°. They are magnetized transversely, parallel to the axis of rotation, in opposite directions. The two stator parts (4, 5) are also formed by semiannular arcs extending over slightly less than 180°. They define between them a semiannular groove forming secondary air gap (6), inside which there is placed Hall probe (7). The Hall probe delivers an electrical signal proportional to the degree of engagement of magnetized portions (1, 2) in main air gap (3).

Figure 10:
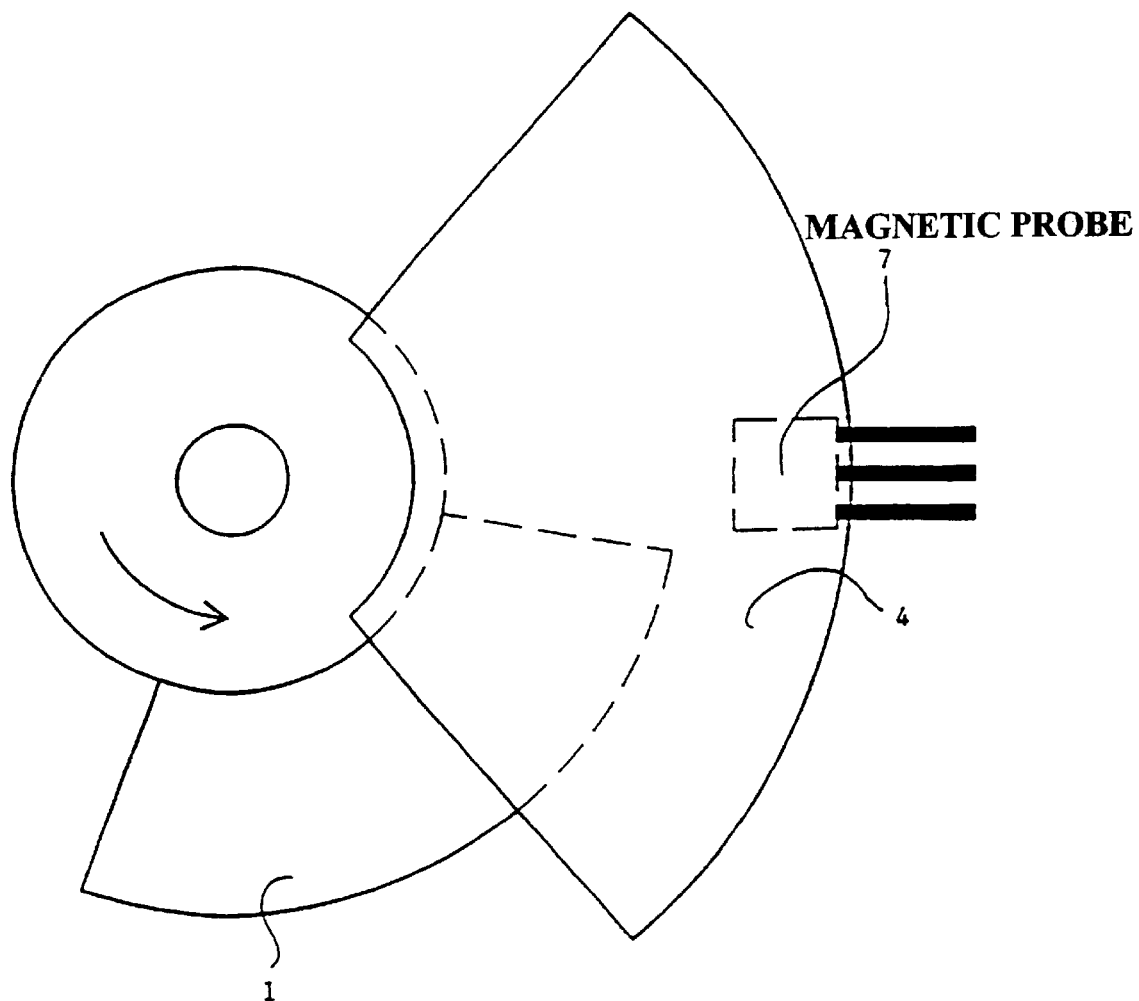
FIGS. 10 and 11 show an alternative design of such an angular sensor.
Figure 11:
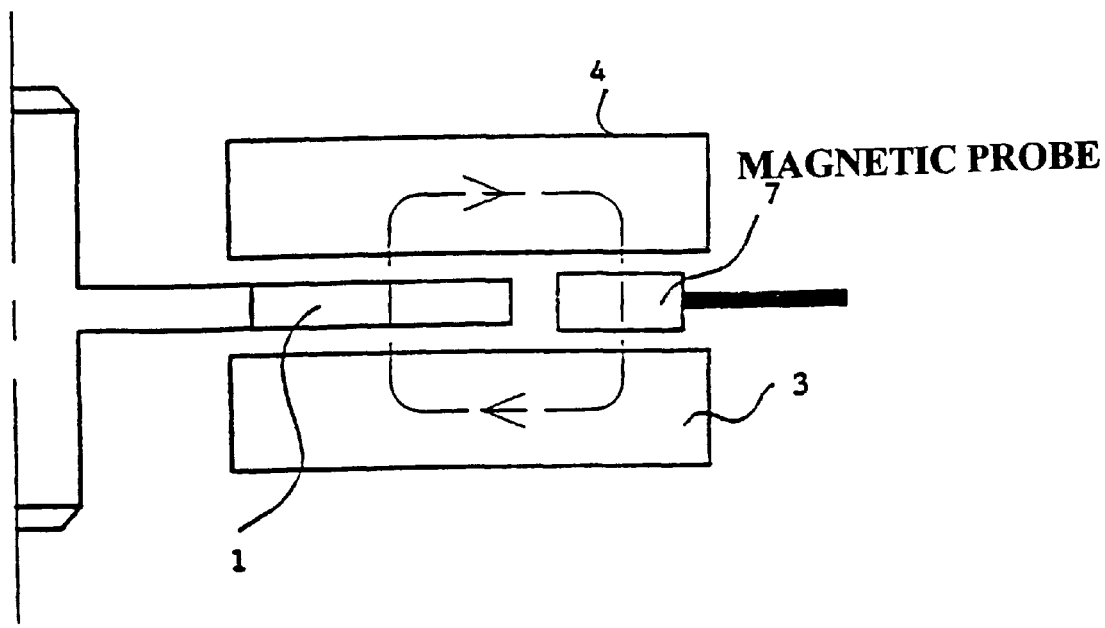

It is also possible to use a structure containing a single magnet and a single stator part. Such an alternative design is shown in FIGS. 10 and 11.

In this variant, the sensor is provided with a single magnet (1) magnetized in the direction of least thickness, parallel to the axis of rotation. The flux is closed via semi-discoid sector (4) forming the stator part, Hall probe (7) and yoke (3).

Figure 12:
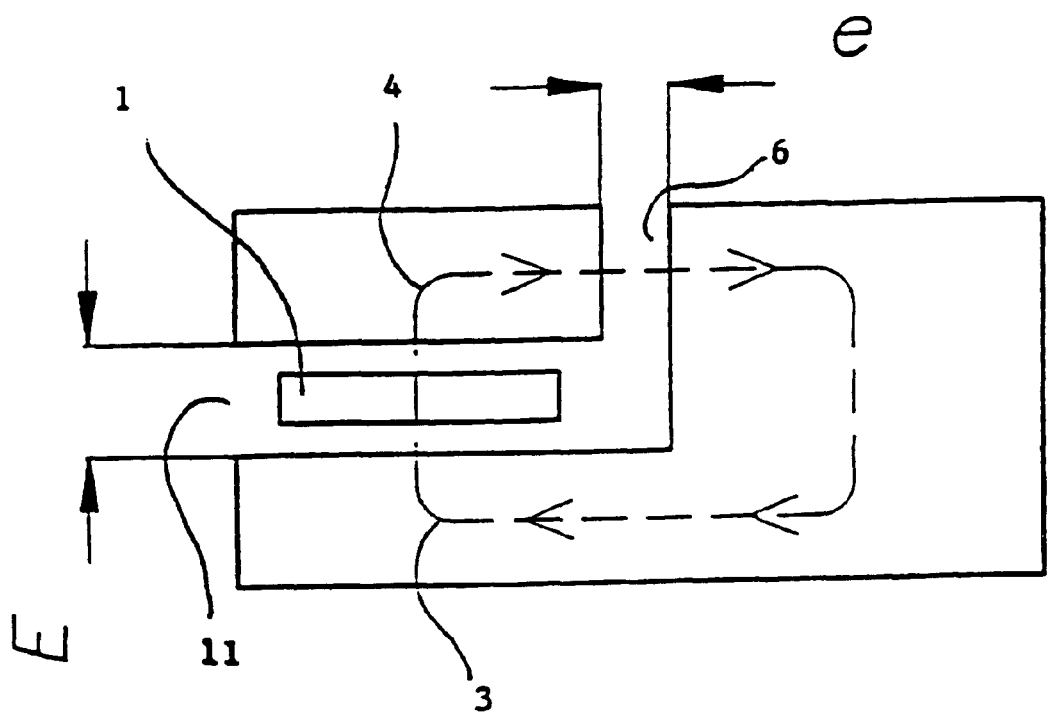
FIGS. 12 to 14 show three alternative designs of a linear sensor.
Figure 13:
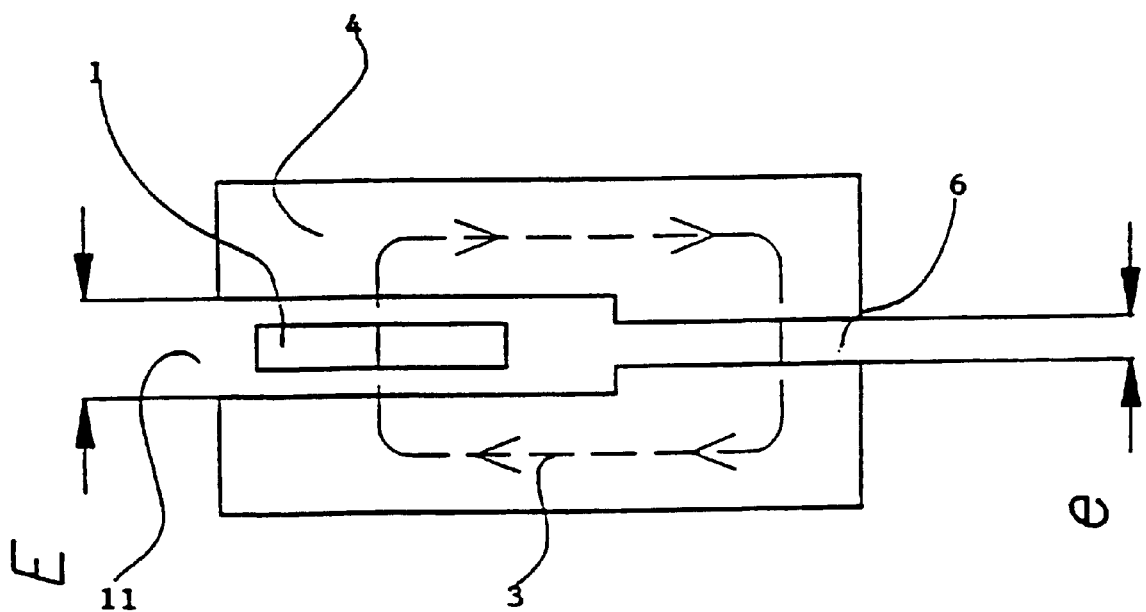
Figure 14:
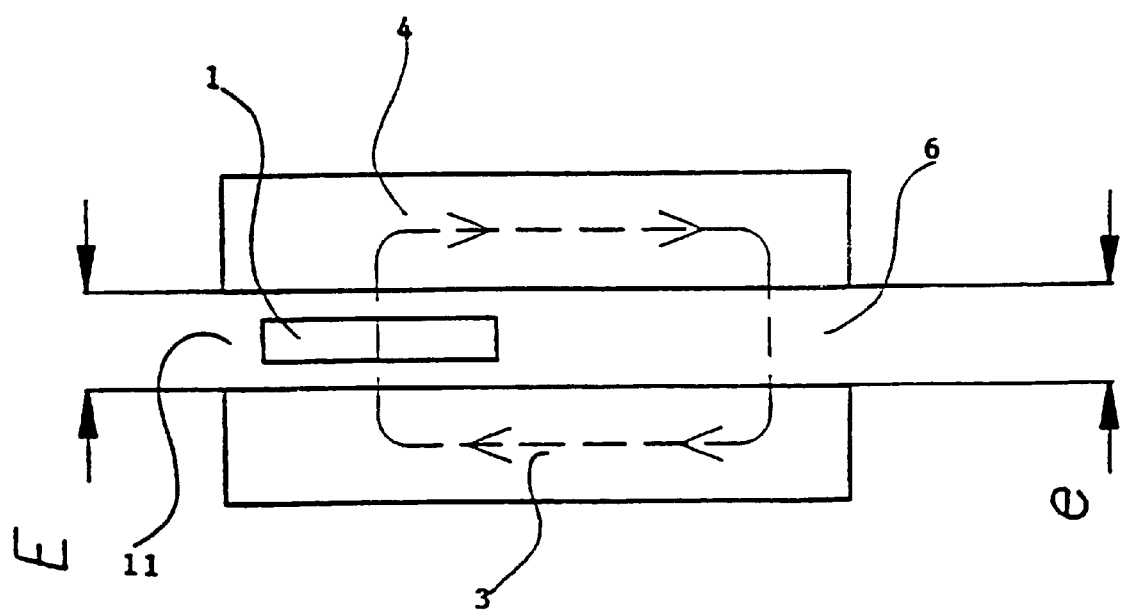

FIGS. 12 to 14 show three alternative designs of a linear sensor.

In these variants, the magnetized portion is provided with a single thin magnet (1). This magnet penetrates more or less completely into main air gap (11). The magnetic field generated by thin magnet (1) is closed via a stator part (4), a secondary air gap (6) in which there is placed a Hall probe, and yoke (3). Measuring air gap (6) is formed by a groove disposed in a plane perpendicular to the field lines generated by permanent magnet (1). This plane contains an axis parallel to the axis of displacement of mobile portion (10). The fixed portion comprises a ferromagnetic part having a U-shaped cross section, the magnet penetrating more or less between the two branches of this U, which define between them the main air gap. The secondary air gap provided either on one of the branches of this U or at the bottom of the U. The magnet is displaced perpendicular to this U-shaped cross section. It is magnetized transversely, or in other words along an axis perpendicular to the two branches of the U. The magnet can be magnetized in place, after assembly of the sensor.

According to the variant shown in FIG. 12, the measuring air gap is perpendicular to the plane of the magnet and of main air gap (11).

In FIG. 13 there is shown a variant in which secondary air gap (6) is a narrow slit provided in the prolongation of main air gap (11). In FIG. 14, this secondary air gap (6) prolongs main air gap (11).

For the examples shown in FIGS. 12 to 14, the induction Be in the measuring air gap is substantially equal to:

$$Be(x)(Br.L.Sa(x))/(Se.E+SE.e)$$

where x denotes the position of the magnet in the engagement direction.

Figure 15:
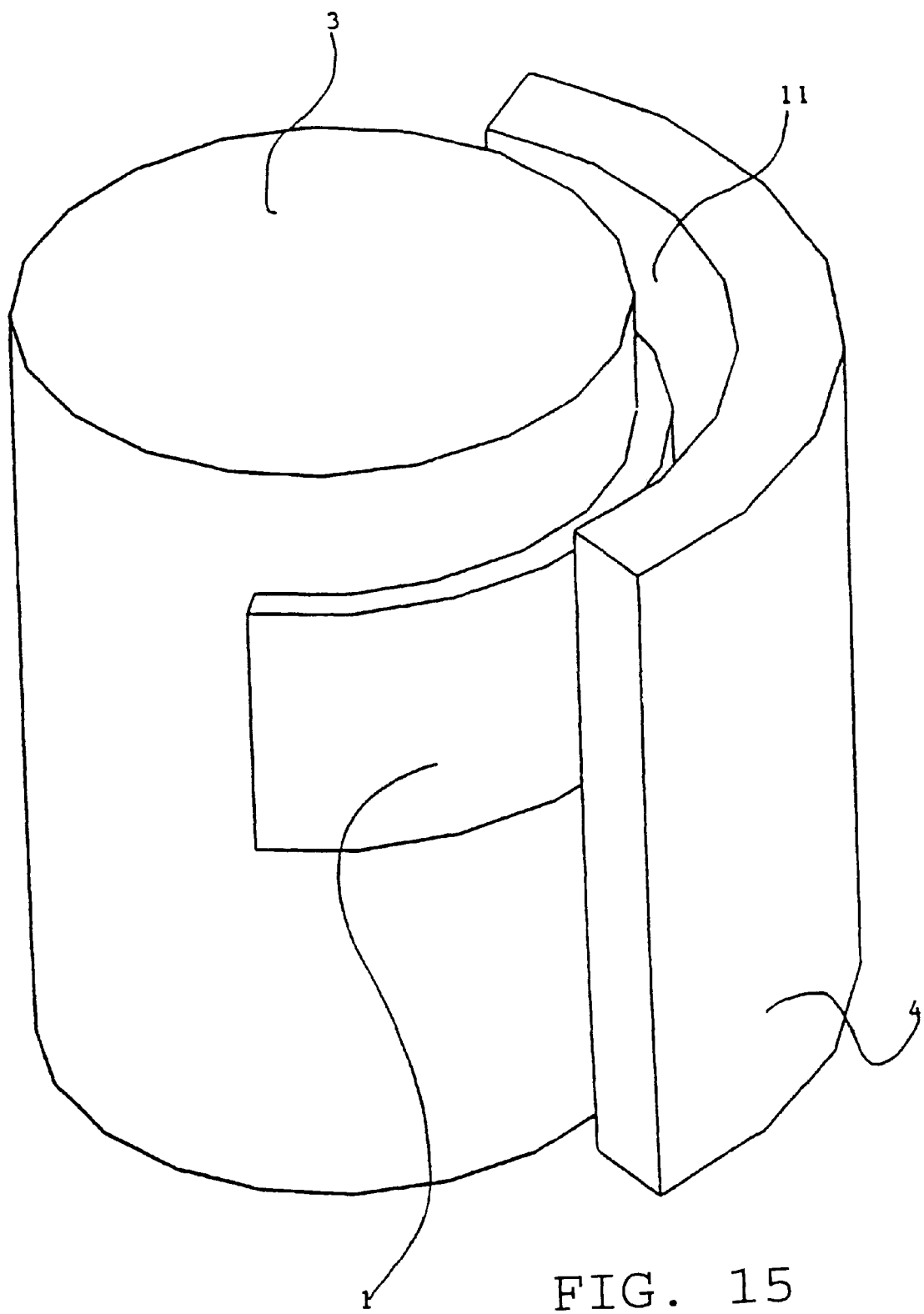
FIG. 15 shows an alternative design of a rotary sensor.

FIG. 15 shows another variant of a rotary sensor with a single magnet (1) of semicylindrical shape, magnetized radially in the direction of least thickness, perpendicular to the axis of rotation. Magnet (1) has substantially the form of a tile extending over approximately 180°. It is bonded to a yoke (3) formed by a ferromagnetic cylinder. The assembly formed by magnet (1) and yoke (3) comprises the portion which is movable relative to a fixed portion formed by a semiannular stator (4) made of ferromagnetic material.

As in the foregoing variants, magnet (1) engages in an annular main air gap (11) of thickness E. The closing of the flux is accomplished through stator (4) and cylindrical yoke (3) via Hall probe (7), perpendicular to the axis of rotation, in an air gap prolonging the main air gap.

Figure 16:
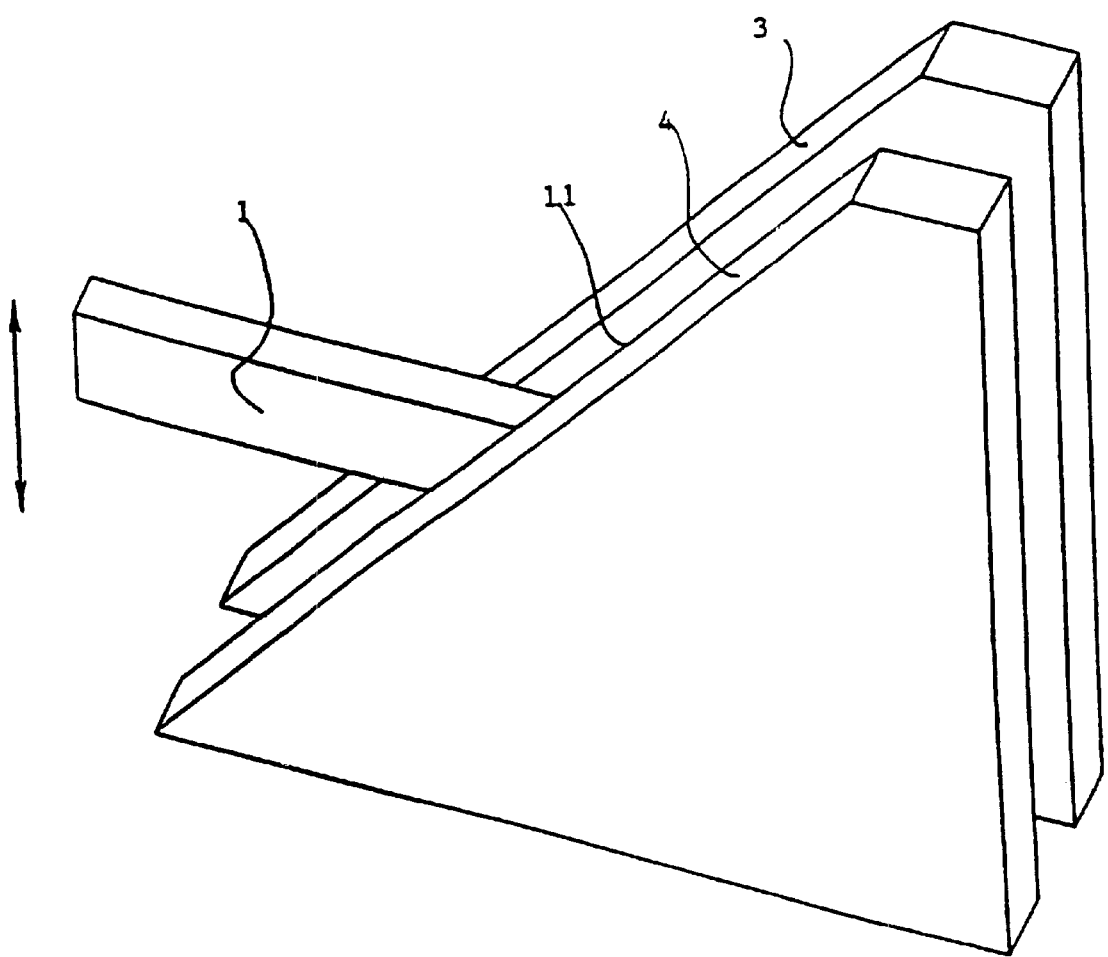
FIGS. 16 and 17 show two alternative designs of a linear sensor.

FIG. 16 shows an alternative design of a linear sensor. This sensor delivers a signal proportional to the degree of engagement of the portions in main air gap (11). This main air gap (11) is bounded by two facing surfaces (3, 4) of trapezoidal shape. Magnet (1) is displaced in a direction which is oblique relative to the front rim of ferromagnetic surfaces (3, 4), in such a way that the degree of engagement of the magnet in the air gap varies as a function of the position of the magnet in this oblique direction. This embodiment makes it possible to construct a sensor whose travel is equal to its length.

Figure 17:
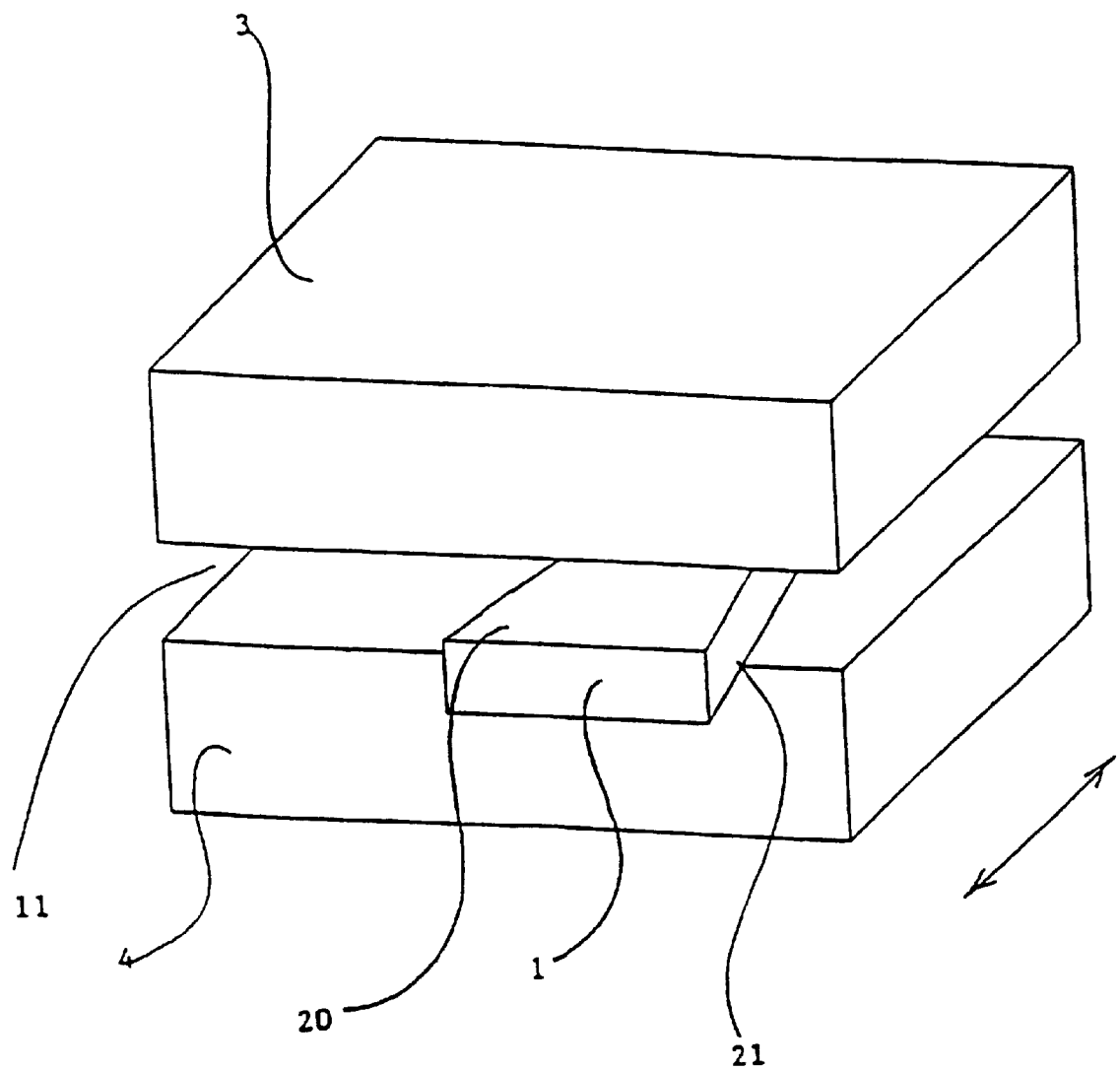

FIG. 17 shows another practical example of a linear sensor, containing a magnet (1) which is movable in a main air gap (11) provided between a yoke (3) and a stator (4). The magnet is provided with two ridges (20, 21), which extend in the direction of displacement but are not mutually parallel. The fact that one of the ridges (21) forms an angle different from 0° with the axis of displacement makes it possible to introduce a specific variation law.

In fact, the engaged surface area is then no longer proportional to the position x of the magnet, but varies according to a law $S(x)=ax(bx+c)$, where a, b and c are coefficients related to the geometry of the magnet. The variation of induction will still be given by the formula $$Be(x)(Br.L.Sa(x))/(Se.E+SE.e).$$

Figure 18:
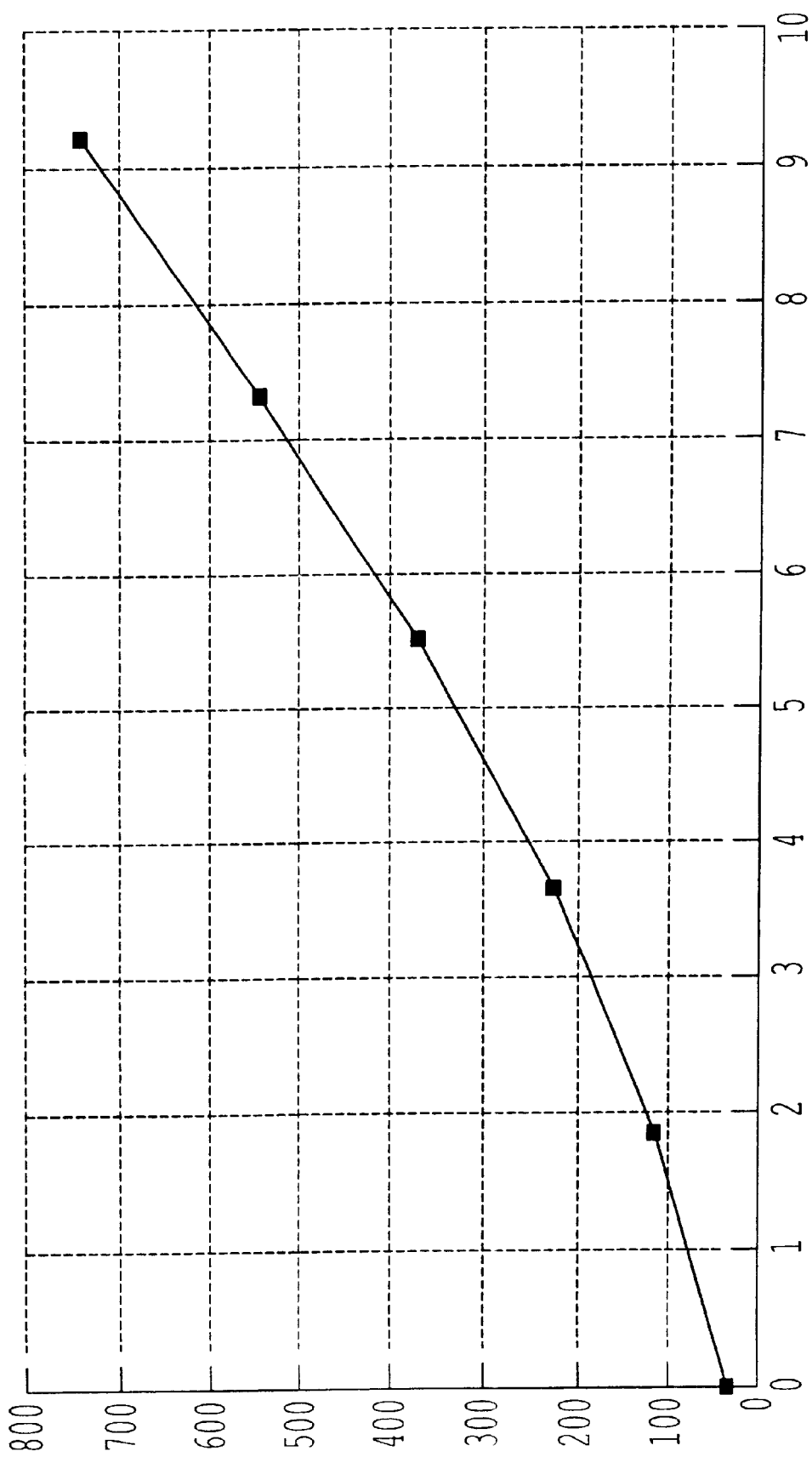
FIG. 18 shows a response curve of a sensor according to the variant of FIG. 17.

The response will then be a parabolic response, such as shown in FIG. 18.

Such a variant makes it possible to compensate for the nonlinearity due to a magnetic leak or to a perturbing element.

Figure 19:
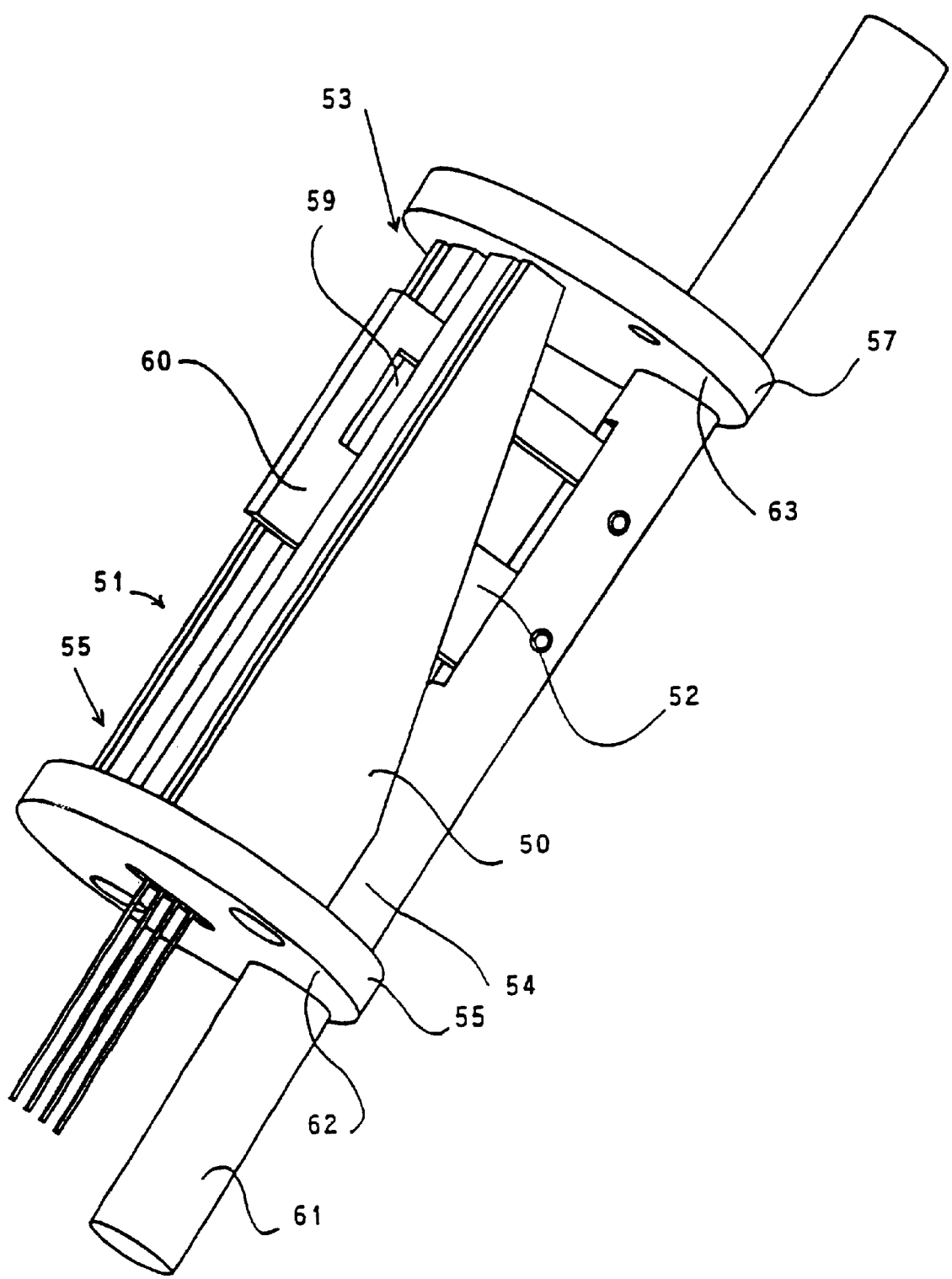
FIG. 19 shows another alternative design of a linear sensor.

FIG. 19 shows a perspective view of an alternative design of a linear sensor.

It comprises two soft iron plates (50, 51) forming the two stator parts. These plates are provided with a portion (52, 53) of variable width, and in the illustrated example of triangular shape, prolonged rearwardly by a portion (54, 55) comprising the communication with the secondary air gap.

The main air gap is defined between the two portions (52, 53) of variable section. The secondary air gap is disposed between the two rear portions (54, 55). These plates are mounted at front and rear on end shields (56, 57) perpendicular to the plane of the stator parts. The end shields are made of plastic. The assembly forms a rigid structure.

Permanent magnet (59) has rectangular shape. It is mounted in a frame (60) of plastic, integral with a control rod (61). This control rod passes through openings (62, 63) provided in end shields (56, 57). Rod (61) drives the displacement of magnet (59) in the main air gap, which in the described example has triangular shape. The degree of penetration varies between a minimum value when the magnet is pushed against front end shield (57) (at the right in FIG. 19), and a maximum value when magnet (59) is pushed to the opposite end of the main air gap, where it is stopped against the beginning of rear portions (54, 55) of the stator parts.

What is claimed is:

1. A magnetic position sensor for delivery of an electrical signal proportional to position, comprising a mobile portion having at least one thin permanent magnet transversely magnetized in the direction of least thickness that is movable in a main air gap perpendicular to the magnetization direction, the said main air gap being defined by at least two ferromagnetic portions, these ferromagnetic portions also defining between them a secondary air gap containing a magnetic-field sensor, the mobile portion being configured so that displacement of a magnetized portion thereof into the main air gap is partial over a portion of useful travel, in such a way that the magnetic-field sensor delivers a signal proportional to the degree of displacement of the magnetized portion into said main air gap, wherein the magnetized portion comprises either two magnets magnetized in opposite directions disposed side-by-side in a direction perpendicular to the displacement, or a single magnet which is displaced in a direction which is oblique relative to the front rim of the ferromagnetic portions, in such a way that the degree of engagement of the single magnet in the main air gap varies as a function of the position of the single magnet in this oblique direction, and in that the magnetic-field sensor disposed in the secondary air gap is placed in a plane perpendicular to the magnetic field lines generated by the single magnet or the two magnets of the magnetized portion.

2. A magnetic position sensor according to claim 1, wherein the length of the magnetized portion is at least equal to C+E, where C denotes the useful travel of the mobile portion and E denotes the thickness of the main air gap.

3. A magnetic position sensor according to claim 1, wherein the length of the main air gap is at least equal to C+E, where C denotes the useful travel of the mobile portion and E denotes the thickness of the main air gap.

4. A magnetic position sensor according to claim 1, wherein the length of the magnetized portion is greater than the length of the main air gap.

5. A magnetic position sensor according to claim 1, wherein the ferromagnetic portions are of semicylindrical shape and the magnetic-field sensor is of semitubular shape.

6. A magnetic position sensor according to claim 1, wherein the magnetized portion comprises the two magnets magnetized in opposite directions parallel to the least thickness disposed side-by-side in the direction perpendicular to the displacement.

7. A magnetic position sensor according to claim 1, wherein the magnetized portion comprises the two magnets that have a semicylindrical shape and the magnetized portion is movable in the main air gap defined between a cylindrical yoke and the ferromagnetic portions that comprise semicylindrical stator parts defining between them the secondary air gap perpendicular to an axis of rotation of the magnetized portion.

8. A magnetic position sensor according to claim 1, wherein the magnetized portion comprises the single magnet formed as a thin permanent magnet of rectangular shape movable in the main air gap perpendicular to the magnetization direction, the ferromagnetic portions forming a substantially U-shaped stator structure having the secondary air gap.

9. A magnetic position sensor according to claim 1, wherein the magnetized portion comprises the two magnets in the form of discoid sectors and the ferromagnetic portions are in the form of discoid sectors.

10. A magnetic portion sensor comprising:
a moveable assembly formed by a single magnet of semicylindrical shape that is magnetized in a direction of least thickness and a cylindrical ferromagnetic yoke supporting the single magnet on a first portion thereof so that the direction of least thickness corresponds to a radial direction of the cylindrical yoke;
a fixed portion formed by a semiannular ferromagnetic stator positioned adjacent to the assembly and defining an air gap with the magnet on the first portion of the yoke being positioned in a main portion of the air gap; and
a Hall probe in a second portion of the air gap between a second portion of the yoke not supporting the magnet that is separated from the main air gap and the semiannular ferromagnetic stator,
wherein a flux path is established from the magnet to and through the main air gap, to and through the semiannular ferromagnetic stator, to and through the Hall probe in the second portion of the air gap, to and through the cylindrical ferromagnetic yoke, to and through the main air gap, and back to the magnetic therein.

11. A magnetic position sensor according to claim 1, wherein the magnetized portion comprises the single magnet.

12. A magnetic position sensor according to claim 1, wherein the magnetized portion or the main air gap has a variable width.

13. A magnetic position sensor according to claim 1, wherein the magnetized portion has a geometric shape specifically designed to permit compensation for a linearity defect due to a magnetic leak or to a perturbing field.

14. A magnetic position sensor according to claim 1, wherein the main air gap has a geometric shape specifically designed to permit compensation for a linearity defect due to a magnetic leak or to a perturbing field.

15. A magnetic position sensor according to claim 1, further comprising two plates forming two stator parts as the ferromagnetic portions, these plates being provided with front portions defining the main air gap having a variable width, prolonged rearwardly by a portion comprising the communication with the secondary air gap, these plates being mounted at front and rear on end shields perpendicular to the plane of the stator parts, the sensor additionally containing a permanent magnet integral with a control rod, which is designed to drive the displacement of the magnet in the main air gap, the degree of penetration varying between a minimum value when the magnet is pushed against the front end shield, and a maximum value when the magnet is pushed to the opposite end of the main air gap, where it is stopped against the beginning of the rear portions of the stator parts.

* * * * *